(12) United States Patent
Moon

(10) Patent No.: US 7,075,547 B2
(45) Date of Patent: Jul. 11, 2006

(54) HYPERPLANE SYMBOL DETECTION

(75) Inventor: Jaekyun Moon, Plymouth, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 361 days.

(21) Appl. No.: 10/219,397

(22) Filed: Aug. 15, 2002

(65) Prior Publication Data

US 2003/0034969 A1 Feb. 20, 2003

Related U.S. Application Data

(60) Provisional application No. 60/312,511, filed on Aug. 15, 2001.

(51) Int. Cl.
*G06T 9/00* (2006.01)

(52) U.S. Cl. ..................... 345/581; 345/555

(58) Field of Classification Search ........... 345/419, 345/420; 382/133, 581, 555
See application file for complete search history.

(56) References Cited

U.S. PATENT DOCUMENTS

| | | | |
|---|---|---|---|
| 5,696,505 A | | 12/1997 | Schouhamer Immink |
| 5,790,692 A | * | 8/1998 | Price et al. .......... 382/133 |
| 5,859,601 A | | 1/1999 | Moon et al. |
| 6,023,783 A | | 2/2000 | Divsalar et al. |

OTHER PUBLICATIONS

Bednarz et al., "Decision Feedback Equalization for Channels with Error Correcting Capabilities", Proceedings of ICC '97, pp. 1607-1612, Aug. 1997.
Bergmans, "Digital Baseband Transmission and Recording", KAP, 1996.
Bergmans, "Discrete-Time Models for Digital Magnetic Recording", Philips J. Res., pp. 531-558, vol. 41, No. 6, 1986.
Brickner et al., "A High Dimensional Signal Space Implementation of FDTS/DF", IEEE Transactions on Magnetics, vol. 32, No. 5, Sep. 1996, pp. 3941-3943.
Brickner et al., "Architectures for the Implementation of a (Continued)

*Primary Examiner*—Almis Jankus
(74) *Attorney, Agent, or Firm*—Mueting, Raasch & Gebhardt, P.A.

(57) ABSTRACT

Low complexity signal-space detection can be applied to a variety of systems, e.g., data storage systems, data communication systems, DVD systems, systems that use media subject to a d=2 minimum run-length constraint, etc. The signal-space detector/method estimates a channel input symbol based on a finite number of observation samples. For example, in the binary input case, the signal-space detector divides a multidimensional space into two disjoint regions corresponding to opposite symbol decisions. The detection system/method determines in which region the observation vector falls and releases a corresponding hard decision, e.g., a binary symbol decision. Further, a soft decision can be provided that measures the reliability of the symbol decision.

30 Claims, 4 Drawing Sheets

OTHER PUBLICATIONS

Fixed Delay Tree Search Detector", IEEE Transactions on Magnetics, vol. 33, No. 2, Mar. 1997, pp. 1116-1123.

Brickner et al., "A Signal Space Representation of Fixed Delay Tree Search for Use with d=0 Codes", IEEE Telecommunications Conference, Globecom '95, Singapore, Nov. 14, 1995, pp. 577-581.

Fan et al., "Low Density Parity Check Codes for Magnetic Recording", submitted to J. Selected Areas on Comm., (Sep. 1999).

Fan et al., "Constrained Coding Techniques for Soft Iterative Decoders", IEEE Globecom '99, pp. 723-727, Dec. 1999.

Forney, "Maximum-Likelihood Sequence Estimation of Digital Sequences in the Presence of Intersymbol Interference" IEEE Trans. On Info. Theory, vol. 18, No. 3, pp. 363-378, May 1972.

Hayashi et al., "DVD Players Using a Viterbi Decoding Circuit", IEEE Trans. On Consumer Electronics, vol. 44, No. 2, May 1998.

Immink, "The Digital Versatile Disk (DVD): System Requirements and Channel Coding", SMPTE Journal, pp. 483-489, Aug. 1996.

Immink, "EFMPlus: The Coding Format of the Multimedia Compact Disk", IEEE Trans. On Consumer Electronics, vol. 41, No. 6, pp. 491-497, Aug. 1995.

Immink, "EFM Coding: Squeezing the Last Bits", IEEE Trans. On Consumer Electronics, vol. 43, No. 3, pp. 491-495, Aug. 1997.

Immink, "The Compact Disk Story", J. Audio Eng. Soc., vol. 46, No. 5, pp. 458-465, May 1998.

Kenney et al., "Multi-Level Decision Feedback Equalization for Saturation Recording", IEEE Transactions on Magnetics, vol. 29, No. 4, Jul. 1993, pp. 2160-2171.

Kim et al., "Delay-Constrained Asymptotically Optimal Detection Using Signal-Space Partitioning", 1998 IEEE International Conference on Communications, vol. 2 of 3, Jun. 7-11, 1998, Atlanta, Georgia, USA, pp. 673-677.

Kim et al., "Multidimensional Signal Space Partitioning Using a Minimal Set of Hyperplanes for Detecting ISI-Corrupted Symbols", IEEE Transactions on Communications, vol. 48, No. 4, Apr. 2000, pp. 637-647.

Kim, "Constrained-Complexity Detection Using Signal Space Partitioning", Ph.D. Dissertation, Dept. of Electrical & Computer Engineering, University of Minnesota, Minneapolis, MN Aug. 1998.

Kim, "Sector Error Rate Comparison of EPRML and Signal Space Detection with Decision Feedback", CDSLab Report, No. YK-98-07, Jul. 1998.

Krachkovsky et al., "Error Propagation Evaluation for RLL-Constrained DFE Read Channels", IEEE Trans. Magn., vol. 34, No. 1, pp. 147-152, Jan. 1998.

Lee et al., "A PRML Detector for a DVDR System", IEEE Trans. On Consumer Electronics, vol. 45, No. 2, May 1999.

Ma, "Application of Soft-Output Detection and Soft Decoding in Magnetic Recording Systems", M.S. Thesis, Dec. (Jun. 2000).

McLaughlin, "Shedding Light on the Future of SP for Optical Recording", IEEE Signal Processing Magazine, pp. 83-94, Jul. 1998.

Messerschmitt, "A Geometric Theory of Intersymbol Interference, Part II: Performance of the Maximum Likelihood Detector", Bell Syst. Tech. J., vol. 52, Nov. 1973.

Moon et al., "Editorial Signal Processing for High Density Storage Channels", IEEE Journal on Selected Areas in Communications, vol. 19, No. 4, Apr. 2001, pp. 577-581.

Moon, "SNR Definition for Magnetic Recording Channels with Transition Noise", IEEE Trans. On Magnetics, vol. 36, pp. 3881-3883, Sep. 2000.

Moon et al., "Performance Comparison of Detection Methods in Magnetic Recording", IEEE Trans. On Magn., vol. 26, No. 6, pp. 3155-3172, Nov. 1990.

Moon et al.,"Efficient Sequence Detection for Intersymbol Interference Channels with Run-Length Constraints", IEEE Trans. On Comm. vol. 42, No. 9, pp. 2654-2660, Sep. 1994.

Steingrimsson et al., "Signal Space Detection for DVD Optical Recording", Presented at TMRC 2000 on Recording Systems, 11th Annual Magnetic Recording Conference, Aug. 14-16, 2000, Santa Clara, CA. Published in IEEE Transactions on Magnetics, vol. 37, No. 2, Mar. 2001, pp. 670-675.

* cited by examiner

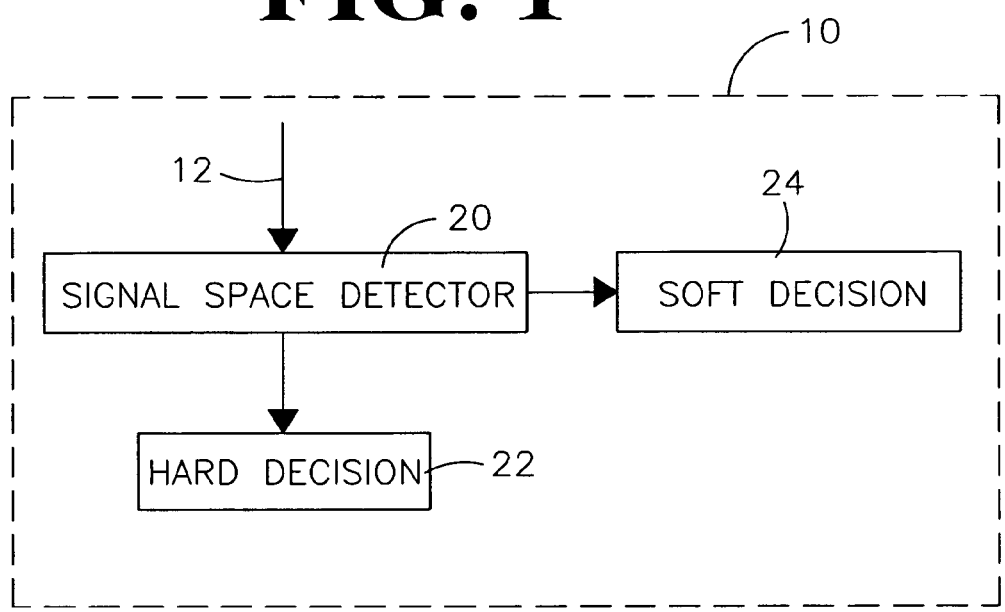
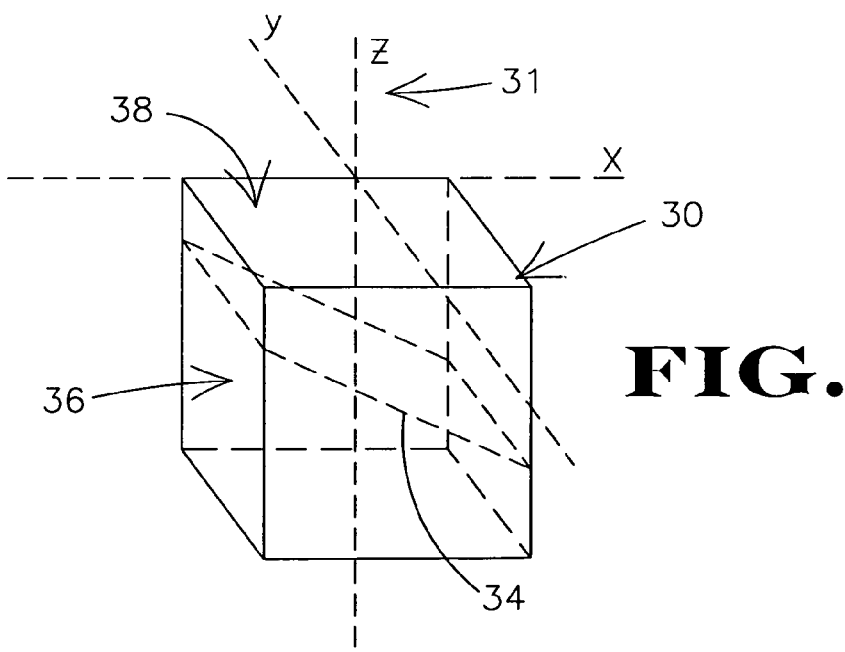

HYPERPLANE SYMBOL DETECTION

This application claims the benefit of the U.S. Provisional Application Ser. No. 60/312,511, filed Aug. 15, 2001, which is incorporated herein by reference in its entirety.

BACKGROUND OF THE INVENTION

The present invention relates generally to data systems such as, for example, data storage systems, data communication systems, etc. More particularly, the present invention pertains to symbol detection techniques for use in such systems.

Data communication systems and data storage systems, e.g., digital versatile disk (DVD) systems, generally require application of signal processing techniques for operation. For example, symbol detection may be required to be applied to a channel of a system for determination of a symbol decision, e.g., a binary symbol decision. With respect to data storage systems, a dramatic increase in data storage density has come from improvements in system hardware, such as read heads, storage media, and also in the interface therebetween. However, increases in data storage can also be attributed to advances in signal processing.

For example, at high densities, readback signals suffer severely from bit crowding or inter-symbol interference (ISI) and also have very poor signal-to-noise ratio (SNR). Conventional readback processing, such as that which involves run-length limited (RLL) codes with peak detection and some readback equalization, is becoming inadequate at very high densities.

Various symbol detection techniques have been described for use in reducing the effects of ISI and for SNR to provide more reliable symbol detection. Generally, the symbol detection techniques can be classified as either maximum likelihood (ML) or decision feedback detectors. Typical of the former is the partial response (PR) maximum likelihood detector, and typical of the latter is the fixed delay tree search with decision feedback (FDTS/DF) detector (e.g., which has been used for symbol detection in DVD channels).

One particular symbol detection technique referred to as signal-space detection has gained attention. For example, as described in an article entitled, "Delay-Constrained Asymptotically Optimal Detection using Signal-Space Partitioning," by Younggyun Kim and Jaekyun Moon, ICC '98-1998 *IEEE International Conference On Communications* (June 1998), an illustrative signal-space detector may estimate a channel input signal based on the location of a finite length observation signal in a multidimensional signal-space. The decision boundary is formed by a set of hyperplanes.

For example, as described therein, a discrete time channel model can be represented by:

$$r_k = \sum_{i=0}^{L} f_i a_{k-i} + n_k$$

where $r_k$ is an observation sample, $\{f_i\}$ represents the overall channel response ($f_0 \neq 0$), $a_k$ is the input symbol taken from $\{+1, -1\}$, and $n_k$ is additive white Gaussian noise. A signal-space detector with a decision delay of $\tau$ makes a decision on symbol $a_{k-\tau}$ at time k based on observation samples $\{r_{k-i}\}$, $0 \leq i \leq \tau$. Past decisions on the input symbols $\{a_{k-i}\}$, $i > \tau$, are used to cancel ISI terms from observation samples.

In this process, past decisions are assumed to be correct. After canceling ISI terms, the detector has the observation samples represented by:

$$x_{k-j} = \sum_{i=0}^{\tau-j} f_i a_{k-j-i} + n_{k-j} = s_{k-j} + n_{k-j}, \quad 0 \leq j \leq \tau$$

where $s_{k-j}$ is the noiseless signal. The detector finds the most probable noiseless signal vector $s = [s_k, \ldots, s_{k-\tau}]^T$ based on the observation sample vector $x = [x_k, \ldots, x_{k-\tau}]^T$ and releases the symbol decision on $a_{k-\tau}$, which is consistent with the most probable signal vector. This can be viewed as partitioning the ($\tau$+1)-dimensional observation space into two decision regions, where two regions are separated by a set of hyperplanes.

The complexity of this detector, as well as the others described above, are undesirable. Optimal performance in a linear channel with additive noise can be achieved by a maximum likelihood sequence detector (MLSD), which is efficiently implemented using a Viterbi algorithm. However, the complexity of such a detector in severe ISI environments makes it impractical for commercial storage applications. PR maximum likelihood offers a detector that is a compromise between complexity and performance by equalizing the channel to a shorter impulse response at the expense of increasing the noise power seen by the detector. Likewise, FDTS/DF detectors provide a trade-off between complexity and performance that can be varied by changing the delay length thereof. As delay length increases, the performance also increases. However, complexity increases along with it. As one might expect, it is desirable to reduce complexity yet retain performance required for desired particular applications.

SUMMARY OF THE INVENTION

The present invention provides for a low complexity signal-space detector that can be applied to a variety of systems, e.g., data storage systems, data communication systems, DVD systems, systems that use media subject to a d=2 minimum run-length constraint, etc. The signal-space detector estimates a channel input symbol based on a finite number of observation samples. For example, in the binary input case, the signal-space detector divides a multidimensional space into two disjoint regions corresponding to opposite symbol decisions. The detection process determines in which region the observation vector falls and releases a corresponding hard decision, e.g., a binary symbol decision. Further, a soft decision can be provided by the signal-space detector that measures the reliability of the symbol decision.

A method for use in detecting input symbols according to the present invention includes providing a finite number of observation samples defining an observation vector. A multidimensional space including first and second regions corresponding to first and second opposite symbols, respectively, is defined. The first and second regions are separated by a single hyperplane. It is determined whether the observation vector is a first or second symbol depending upon whether the observation vector is located in the first or second region.

In one embodiment of the method, the method further includes providing an output representative of the reliability of the determination of whether the observation vector is a first or second symbol based on a distance of the observation vector from the single hyperplane.

In another embodiment of the method, the observation samples may be of a signal obtained from a storage media or a data communication channel, may be of a signal obtained from a media subject to a d=2 minimum runlength constraint; or may be of a signal obtained from a digital versatile disk.

In yet another embodiment of the method, the definition of the multi-dimensional space may include implementing the single hyperplane using a finite impulse response filter (e.g., defining a slope of the single hyperplane by the taps of the finite impulse response filter; adjusting the slope of the single hyperplane as a function of noise, adding a constant to an output of the finite impulse response filter to define a shift of the single hyperplane, using internal feedback to make symbol determination independent of past determinations, etc.)

A detection system for use in detecting input symbols according to the present invention is also described. The detection system includes a finite impulse response filter operable to be driven by observation samples, wherein a finite number of observation samples define an observation vector. Taps of the finite impulse response filter provide for a slope of a single hyperplane defined in a multi-dimensional space. The multi-dimensional space includes first and second regions corresponding to first and second opposite symbols, respectively, and further the first and second regions are separated by the single hyperplane. The detection system further includes an output device operable to receive an output from the finite impulse response filter and provide a determination of whether an observation vector is a first or second symbol depending upon whether the observation vector is located in the first or second region of the multi-dimensional space.

In one embodiment of the system, the system includes an additional output for providing an indicator of the reliability of the determination of whether the observation vector is a first or second symbol based on a distance of the observation vector from the single hyperplane.

The system may be associated with a storage media or a data communication channel, may be operable to receive observation samples from a media subject to a d=2 minimum runlength constraint, and/or may be operable to detect symbols of a signal obtained from a digital versatile disk.

Another method for use in detecting channel input symbols from a signal obtained from a digital versatile disk media is also described. The media is subject to a d=2 runlength constraint. The method includes providing a finite number of observation samples defining an observation vector. A multi-dimensional space is defined that includes first and second regions corresponding to first and second opposite symbols, respectively, wherein the first and second regions are separated by a single hyperplane. The first symbol is associated with three signal points and the second opposite symbol is associated with a single signal point due to the d=2 runlength constraint. It is determined whether the observation vector is a first or second symbol depending upon whether the observation vector is located in the first or second region.

A digital versatile disk system according to the present invention is operable to provide a finite number of observation samples defining an observation vector. Further, the system defines a multi-dimensional space including first and second regions corresponding to first and second opposite symbols, respectively, wherein the first and second regions are separated by a single hyperplane. The system is operable to determine whether the observation vector is a first or second symbol depending upon whether the observation vector is located in the first or second region.

BRIEF DESCRIPTION OF THE DRAWINGS

FIG. 1 is a general illustrative block diagram of a system including hyperplane symbol detection according to the present invention.

FIG. 2 is an illustrative graphical illustration of a multi-dimensional space for use in symbol detection as shown generally in FIG. 1 having a single hyperplane defined therein according to the present invention.

DETAILED DESCRIPTION OF THE EMBODIMENTS

Figure 3:
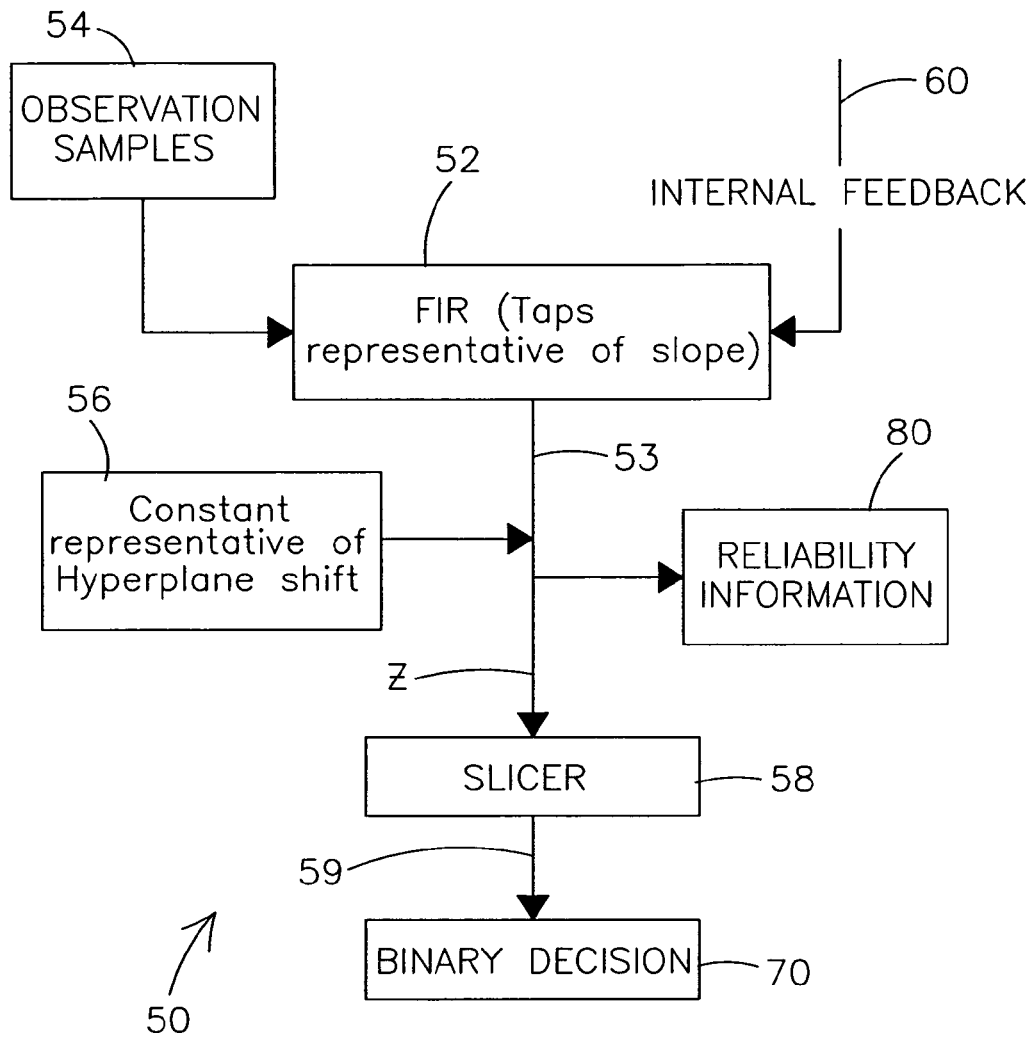
FIG. 3 is a block diagram of one illustrative embodiment of a signal-space detector according to the present invention shown generally in FIG. 1.
Figure 4:
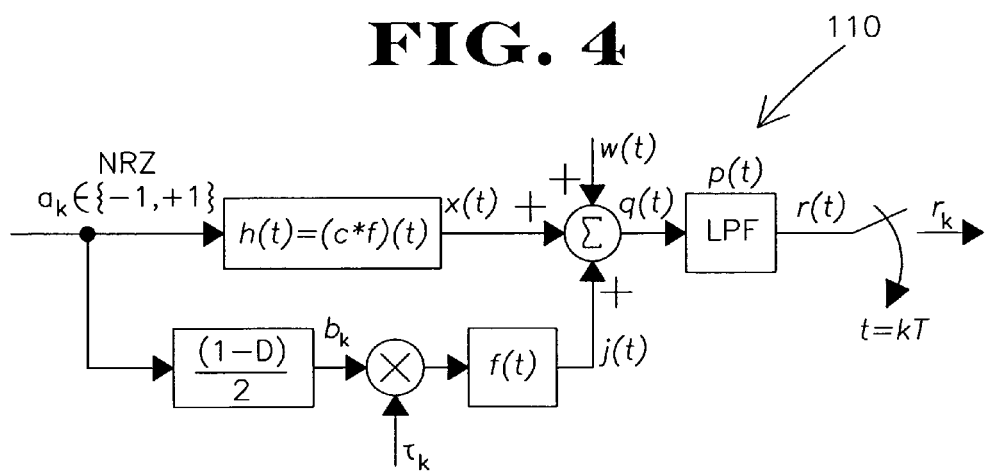
FIG. 4 is a block diagram of one illustrative embodiment of a DVD channel.

The present invention shall be generally described with reference to FIGS. 1–2. Thereafter, an illustrative embodiment of a signal-space detector according to the present invention shall be described with reference to FIG. 3. Further, an application of the present invention specifically to optical recording, and more particularly to DVD optical recording, shall be described with reference to FIGS. 4–7.

FIG. 1 shows a system 10 including a signal-space detector 20 according to the present invention for receiving a signal 12 representative of information in the form of symbols, e.g., binary symbols. The signal-space detector 20 provides for detection of the symbols and provision of an output in the form of a hard decision 22, e.g., binary output. Further, the signal-space detector 20 provides information in the form of a soft decision 24 representative of a measure of the reliability of the hard decision 22.

The system 10 for which the signal-space detector 20 and methods relating thereto may be beneficial, include any system that provides a signal representative of symbols to be detected, e.g., data storage systems, data communication systems, etc. Preferably, for example, the system 10 is a data storage system or a data communication system that provides one or more channels of information in the form of symbols to be detected, e.g., hard disk drive systems, DVD systems, optical media systems, magnetic media systems, etc.

Preferably, system 10 is a system that uses media subject to a d=2 minimum run-length constraint. For example, various disk drive storage systems are subject to such a constraint. More preferably, DVD systems are generally subject to such a constraint included in the EFMPlus modulation code, which is the standard modulation code method for DVD media.

Generally, signal-space detector 20 estimates the input symbols represented by the signal based on a finite number of observation samples of the signal. For example, in an input binary symbol input channel, the signal-space detector 20 divides a multidimensional space 30 represented generally in FIG. 2 into two disjoint regions corresponding to opposite symbol decisions.

As shown in FIG. 2, the multidimensional space 30 is divided into a first region 36 corresponding to a first symbol type (e.g., a symbol representative of a "0") and a second region 38 corresponding to a second opposite symbol (e.g., a symbol representative of a "1"). The first region 36 and second region 38 are separated by a single hyperplane 34 which, in other words, separates the two types or classes of symbols.

In operation, the signal-space detector 20 is provided with a finite number of observation samples of the symbol input signal 12. The observation samples define an observation sample vector that falls in either the first region 36 or the second region 38 separated therefrom by the single hyperplane 34. The detection process proceeds to determine in which region (i.e., first region 36 or second region 38) the observation vector falls and releases a corresponding hard symbol decision 22 based thereon. In other words, the single hyperplane symbol detector 20 determines whether the observation vector defined by the observation samples is a first or second symbol type (e.g., a "0" or a "1") depending on whether the observation vector is located in the first region 36 or the second region 38.

The signal-space detector 20 preferably operates on or considers three observation samples (e.g., consecutive observation samples) and, as such, operates in three-dimensional space. With use of a single hyperplane in such three-dimensional space, a low complexity detector can be constructed, as will be described further herein.

The signal-space detector 20, as generally described herein, particularly takes advantage of media subject to the d=2 minimum run-length constraint included in many coding methods. For example, the single space detector 20 takes particular advantage of the d=2 minimum run-length constraint included in the EFMPlus modulation code; the standard modulation coding method for DVDs. As is further described herein with reference to an example signal-space detector for detecting symbols in a DVD channel, because the d=2 constraint eliminates the occurrence of certain signal points, there are three signal points associated with one type of decision symbol, and only one signal point associated with an opposite symbol. The signal-space detector for the DVD system is based on the implementation of a single hyperplane that would separate as effectively as possible the two classes of signal points associated with the two opposite symbols.

The hard decision 22 resulting from operation of the signal-space detector 20 provides information for use in later processing by system 10. For example, such hard decisions 22, e.g., determination of binary data, may be used in other decoding processes, such as error detection and correction processes, etc.

The signal-space detector 20, as described herein, is also operable to provide soft decision information 24. Such soft decisions may also be advantageously used in later processing of the detected data. For example, soft decision detectors are important when coded data is iteratively decoded by one of various decoding techniques, e.g., message passing algorithms, turbo decoding, etc.

Soft decisions 24 include a measure of reliability of the given hard decisions 22. For example, with reference to FIG. 2, the reliability of a hard decision 22 is proportional to the distance of an observation vector to the hyperplane 34. In other words, if the observation vector is close to the decision boundary represented by the hyperplane 34, there is a good chance that even a small perturbation could have flipped the hard decision from detection of a symbol in region 36 to, rather, a symbol corresponding to region 38. Such observation vectors located close to the hyperplane clearly indicate that the confidence level is low with respect to the hard decision 22. On the other hand, if the observation vector were safely away from the decision boundary represented by the hyperplane 34, then the hard decision 22, based on such location of the observation vector, is likely to be correct.

The present invention and/or one or more portions thereof may be implemented in hardware or software, or a combination of both. For example, the functions described herein may be designed in conformance with the principles set forth herein and implemented as one or more integrated circuits using a suitable processing technology, e.g., CMOS.

As another example, the present invention may be implemented using one or more computer programs executing on programmable computers, such as computers that include, for example, processing capabilities, data storage (e.g., volatile and nonvolatile memory and/or storage elements), input devices, and output devices. Program code and/or logic described herein is applied to input data to perform functionality described herein and generate desired output information. The output information may be applied as an input to one or more other devices and/or processes, in a known fashion.

Any program used to implement the present invention may be provided in a high level procedural and/or object orientated programming language to communicate with a computer system. Further, programs may be implemented in assembly or machine language. In any case, the language may be a compiled or interpreted language.

Any such computer programs may preferably be stored on a storage media or device (e.g., ROM or magnetic disk) readable by a general or special purpose program, computer, or a processor apparatus for configuring and operating the computer when the storage media or device is read by the computer to perform the procedures described herein. The system may also be considered to be implemented as a computer readable storage medium, configured with a computer program, where the storage medium so configured causes the computer to operate in a specific and predefined manner to perform functions described herein.

In view of the above, it will be readily apparent that the functionality as described herein may be implemented in any manner as would be known to one skilled in the art.

FIG. 3 provides a block diagram of one illustrative embodiment of a signal-space detector 50 according to the present invention. The signal-space detector 50 is implemented using a short finite impulse response filter 52 driven by observation samples 54. The filter taps of the finite impulse response filter 52 determine the slope of the hyperplane 34 with reference to a coordinate system 31 of the multidimensional space 30 as shown generally in FIG. 2.

A constant 56 is added to the output 53 of the finite impulse response filter 52. The constant 56 is representative of a shift of the hyperplane 34 along at least one axis of the coordinate system 31 of the multidimensional space 30.

After the constant 56 is added to the output 53 of the finite input response filter 52, a slicer 58 is applied to generate a binary decision 70. Preferably, the output 53, with the constant 56 added thereto, is sliced at the zero (0) level to generate the binary indicator signal 59 representative of a symbol type for providing the hard decision information 70.

Preferably, internal decision feedback 60 is used to make the detector output independent of past decisions. In other words, preferably, the finite impulse response filter 52 is a modified finite impulse response filter to allow internal decision feedback operation to fix the detector structure regardless of past decisions.

The slicer output 59 indicates on which side of the hyperplane the observation vector belongs. Thus, output 59 may itself be considered a binary symbol decision.

Further, jitter noise on the system may be significant. The effect of such jitter noise may be effectively reduced by adjusting the slope of the hyperplane (e.g., decision boundary) to improve performance. Such adjustment may be provided via adjustment of the filter taps (e.g., coefficients and delay).

Further, global decision feedback is employed to cancel the tail effect of inter-symbol interference. It is necessary to control the number of inter-symbol interference terms that are processed by the detector.

The soft decision information, i.e., reliability information 80, is defined as cz, where z is the input to slicer 58 and c is a proportionality factor that depends on the various conditions. For example, such proportionality factor may depend on the channel conditions such as signal-to-noise ratio and other channel impediments. The slicer input z is representative of the distance of the observation vector to the hyperplane 34.

One will recognize that modifications to the finite impulse response implementation of the signal-space detector generally shown in FIG. 3 may be modified without deviation from the claimed subject matter herein. For example, as used herein, the slicer 58 may be implemented using any number of different techniques including comparison techniques, thresholds, etc.

The following is presented as an example of the present invention described herein to illustrate the use of a single hyperplane in symbol detection. The following example is provided with reference to a low complexity signal-space detector (SSD) 100 (e.g., illustrated in FIG. 6) for a digital versatile disk (DVD) channel 110 (e.g., illustrated in FIG. 4).

EXAMPLE

The SSD 100 proposed in this example is a low complexity approximation of the fixed delay tree search with decision feedback (FDTS/DF) detector with decision delay of $\tau=2$. With the d=2 code constraint implied in EFMPlus modulation code, FDTS/DF with $\tau=2$ provides a large gain relative to the PR maximum likelihood detectors. The $\tau=2$ FDTS/DF performance can be realized with an SSD 100 that relies on a single hyperplane 120 (e.g., illustrated in FIG. 7) as its decision boundary in three-dimensional signal-space 115 (e.g., also as illustrated in FIG. 7).

Figure 5:
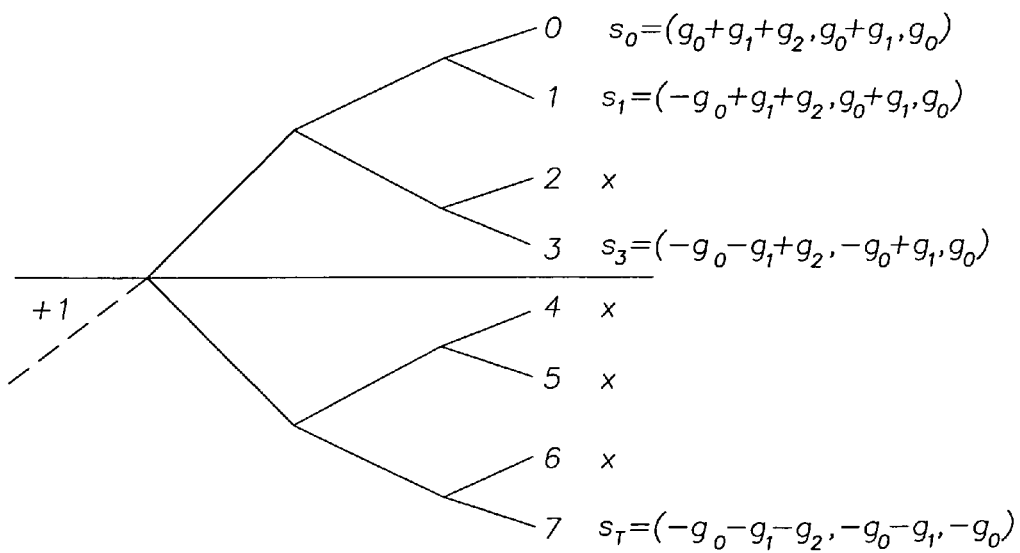
FIG. 5 is an illustrative embodiment of a signal-space detector using a single hyperplane as a symbol detection decision boundary for a DVD channel generally illustrated in FIG. 4.

FIG. 5 gives an example of how the coordinates of the noiseless centers in signal-space are derived for the SSD detector 100 with 1 sample lookback from the tree structure of the corresponding FDTS/DF detector. FIG. 5 assists in illustrating the derivation of a SSD detector with 1 sample lookback from the corresponding FDTS/DF detector for the case when $\hat{a}_{k-3}=-1$. For $\hat{a}_{k-3}=+1$, the SSD detector with 1 sample lookback has 4 signal points, which are labeled as $s_0$, $s_1$, $s_3$, and $s_7$. As such, branches 2, 4, 5 and 6 are eliminated from the tree structure. This leads to the elimination of corresponding noiseless signals $s_2$, $s_4$, $s_5$ and $s_6$ as indicated by the "Xs".

Figure 7:
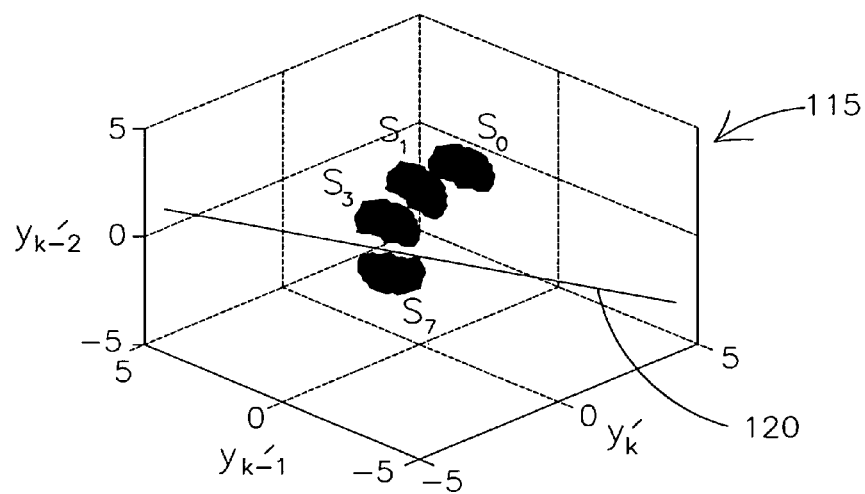
FIG. 7 is an illustrative diagram of a multidimensional space having a hyperplane defined therein for the illustrative DVD application example described with reference to FIGS. 4–6.

FIG. 7 shows the received noise clouds in the signal space centered by signal vectors of the form $y'_k=(y'_k, y'_{k-1}, y'_{k-2})$, where $$y'_k = y_k$$

$$y'_{k-1} = y_{k-1} - g_2 \hat{a}_{k-3}$$

$$y'_{k-2} = y_{k-2} - (g_1 \hat{a}_{k-3} + _2 \hat{a}_{k-4})$$

with $y_k$ denoting an equalized signal at the detector input. The detector has a particularly simple implementation. For both values of $\hat{a}_{k-3}$, the signal constellations can be separated by a single hyperplane 120.

When there exists signal-dependent correlated noise (e.g., jitter), the single hyperplane can easily be adjusted to improve noise immunity without undergoing any significant changes in the detector structure. In fact, when the amount of additive white noise is low and the amount of jitter noise high, the SSD detector based on a single hyperplane gives better performance than FDTS/DF, provided that the hyperplane is tilted appropriately to increase the effective signal margin against jitter. The optimal tilt can be determined by a recursive procedure where the minimum distance between the noiseless signal centers to the hyperplane is maximized as described in Y. Kim and J. Moon, "Delay-constrained asymptotically optimal detection using signal-space partitioning," in ICC '98, June 1998 and also in Y. Kim and J. Moon, "Multi-dimensional signal-space partitioning using a minimal set of hyperplanes for detecting ISI-corrupted symbols," *IEEE Trans. on Commun.* (1999).

Figure 6:
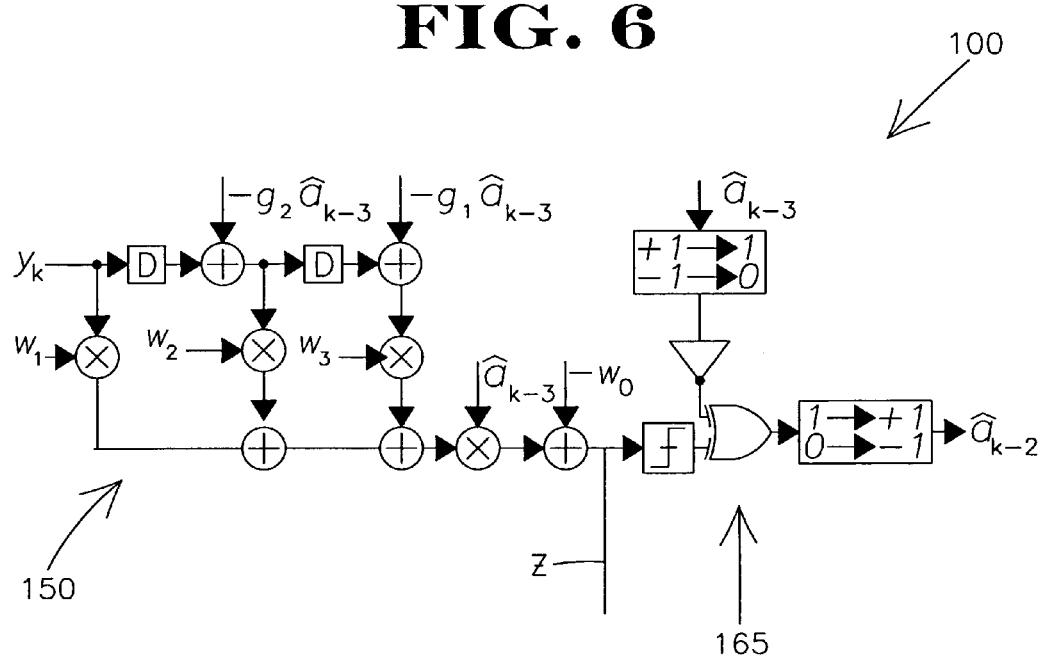
FIG. 6 is a tree diagram for use in describing the signal-space detector for the DVD application where the media is subject to a d=2 run-length constraint as shown generally in FIG. 4.

FIG. 6 represents a diagram of the SSD detector 100 using a single hyperplane 120 as the decision boundary. The taps of the finite impulse response filter 150 provide the slope of the hyperplane and constant $w_0$ provides for shift of the hyperplane in the multi-dimensional space. Slicer and associated logic 165 provides for the output of a hard binary decision based on the input $y_k$.

Further, with regard to soft output information, the SSD can return soft probabilistic decisions while still maintaining low complexity. If the received sample $y'_k$ is very close to the hyperplane, the reliability of a hard decision on $\hat{a}_{k-2}$ is not good. The reliability is much better if $y'_k$ is far away from the hyperplane. Information about confidence of a decision on $\hat{a}_{k-2}$ can thus be modeled as:

$$LLR_{app}(a_{k-2}) \approx cz$$

where z denotes the distance from $y'_k$ to the hyperplane. The variable z can be generated from $y'_k$ with a 3-tap FIR filter and an offset leading to a structure essentially the same as that of FIG. 6. In other words, output z as shown in FIG. 6 is used to provide soft information.

All references cited herein are incorporated in their entirety as if each were incorporated separately. This invention has been described with reference to illustrative embodiments and is not meant to be construed in a limiting sense. Various modifications of the illustrative embodiments, as well as additional embodiments of the invention, will be apparent to persons skilled in the art upon reference to this description.

What is claimed is:

1. A method for use in detecting input symbols, the method comprising:
   providing a finite number of observation samples defining an observation vector;
   using only a single hyperplane to define a multi-dimensional space comprising first and second regions corresponding to first and second opposite symbols, respectively, wherein the first and second regions are separated by the single hyperplane; and determining whether the observation vector is a first or second symbol depending upon whether the observation vector is located in the first or second region.

2. The method of claim 1, wherein the method further comprises providing an output representative of the reliability of the determination of whether the observation vector is a first or second symbol based on a distance of the observation vector from the single hyperplane.

3. The method of claim 1, wherein the observation samples comprise observation samples of a signal obtained from a storage media or a data communication channel.

4. A method for use in detecting input symbols, the method comprising:

providing a finite number of observation samples defining an observation vector, wherein the observation samples comprise observation samples of a signal obtained from a media subject to a d=2 minimum runlength constraint;

defining a multi-dimensional space comprising first and second regions corresponding to first and second opposite symbols, respectively, wherein the first and second regions are separated by a single hyperplane; and determining whether the observation vector is a first or second symbol depending upon whether the observation vector is located in the first or second region.

5. The method of claim 4, wherein the observation samples comprise observation samples of a signal obtained from a digital versatile disk.

6. A method for use in detecting input symbols, the method comprising:

providing a finite number of observation samples defining an observation vector;

defining a multi-dimensional space comprising first and second regions corresponding to first and second opposite symbols, respectively, wherein the first and second regions are separated by a single hyperplane, and further wherein defining a multi-dimensional space comprises implementing the single hyperplane using a finite impulse response filter; and determining whether the observation vector is a first or second symbol depending upon whether the observation vector is located in the first or second region.

7. The method of claim 6, wherein implementing the single hyperplane using a finite impulse response filter comprises defining a slope of the single hyperplane by the taps of the finite impulse response filter.

8. The method of claim 7, wherein the method further comprises adjusting the slope of the single hyperplane as a function of noise.

9. The method of claim 6, wherein implementing the single hyperplane using a finite impulse response filter comprises adding a constant to an output of the finite impulse response filter to define a shift of the single hyperplane.

10. The method of claim 6, wherein implementing the single hyperplane using a finite impulse response filter comprises using internal feedback to make symbol determination independent of past determinations.

11. A detection system for use in detecting input symbols, the system comprising:

a finite impulse response filter operable to be driven by observation samples, wherein a finite number of observation samples define an observation vector, wherein taps of the finite impulse response filter provide for a slope of a single hyperplane defined in a multi-dimensional space comprising first and second regions corresponding to first and second opposite symbols, respectively, and further wherein the first and second regions are separated by the single hyperplane; and an output device operable to receive an output from the finite impulse response filter and provide a determination of whether an observation vector is a first or second symbol depending upon whether the observation vector is located in the first or second region of the multi-dimensional space.

12. The system of claim 11, wherein the system further comprises an additional, output for providing an indicator of the reliability of the determination of whether the observation vector is a first or second symbol based on a distance of the observation vector from the single hyperplane.

13. The system of claim 11, wherein the system is associated with a storage media or a data communication channel.

14. The system of claim 11, wherein the system is operable to receive observation samples from a media subject to a d=2 minimum runlength constraint.

15. The system of claim 14, wherein the system is operable to detect symbols of a signal obtained from a digital versatile disk.

16. The system of claim 11, wherein a constant is added to an output of the finite impulse response filter to define a shift of the single hyperplane.

17. The system of claim 11, wherein the finite impulse response filter is modified by internal feedback to make symbol determination independent of past determinations.

18. A method for use in detecting channel input symbols from a signal obtained from a digital versatile disk media, the media subject to a d=2 runlength constraint, the method comprising:

providing a finite number of observation samples defining an observation vector;

defining a multi-dimensional space comprising first and second regions corresponding to first and second opposite symbols, respectively, wherein the first and second regions are separated by a single hyperplane, and further wherein the first symbol is associated with three signal points and the second opposite symbol is associated with a single signal point due to the d=2 runlength constraint; and determining whether the observation vector is a first or second symbol depending upon whether the observation vector is located in the first or second region.

19. The method of claim 18, wherein the method further comprises providing an output representative of the reliability of the determination of whether the observation vector is a first or second symbol based on a distance of the observation vector from the single hyperplane.

20. The method of claim 18, wherein defining a multi-dimensional space comprises implementing the single hyperplane using a finite impulse response filter.

21. The method of claim 20, wherein implementing the single hyperplane using a finite impulse response filter comprises defining a slope of the single hyperplane by taps of the finite impulse response filter.

22. The method of claim 21, wherein the method further comprises adjusting the slope of the single hyperplane as a function of noise.

23. The method of claim 20, wherein implementing the single hyperplane using a finite impulse response filter comprises adding a constant to an output of the finite impulse response filter to define a shift of the single hyperplane.

24. The method of claim 20, wherein implementing the single hyperplane using a finite impulse response filter comprises using internal feedback to make symbol determination independent of past determinations.

25. A digital versatile disk system, the system comprising:
means for providing a finite number of observation samples defining an observation vector;
means for using only a single hyperplane to define a multi-dimensional space comprising first and second regions corresponding to first and second opposite symbols, respectively, wherein the first and second regions are separated by the single hyperplane; and
means for determining whether the observation vector is a first or second symbol depending upon whether the observation vector is located in the first or second region.

26. The system of claim 25, wherein the system further comprises means for providing an output representative of the reliability of the determination of whether the observation vector is a first or second symbol based on a distance of the observation vector from the single hyperplane.

27. A digital versatile disk system, the system comprising:
means for providing a finite number of observation samples defining an observation vector;
means for defining a multi-dimensional space comprising first and second regions corresponding to first and second opposite symbols, respectively, wherein the first and second regions are separated by a single hyperplane, and further wherein the means for defining a multi-dimensional space comprises means for implementing the single hyperplane using a finite impulse response filter; and
means for determining whether the observation vector is a first or second symbol depending upon whether the observation vector is located in the first or second region.

28. The system of claim 27, wherein the means for implementing the single hyperplane using a finite impulse response filter comprises means for defining a slope of the single hyperplane by taps of the finite impulse response filter.

29. The system of claim 27, wherein the means for implementing the single hyperplane using a finite impulse response filter comprises means for adding a constant to an output of the finite impulse response filter to define a shift of the single hyperplane.

30. The system of claim 27, wherein the means for implementing the single hyperplane using a finite impulse response filter comprises means for using internal feedback to make symbol determination independent of past determinations.

* * * * *